United States Patent [19]

Arnold

[11] Patent Number: 4,814,209

[45] Date of Patent: Mar. 21, 1989

[54] PAINT FOR INHIBITING RUST STAINING

[75] Inventor: David E. J. Arnold, Gosforth, United Kingdom

[73] Assignee: International Paint Public Limited Company, United Kingdom

[21] Appl. No.: 117,906

[22] Filed: Oct. 30, 1987

Related U.S. Application Data

[63] Continuation of Ser. No. 840,372, Mar. 17, 1986, abandoned.

[30] Foreign Application Priority Data

Mar. 19, 1985 [GB] United Kingdom ............ 8507048

[51] Int. Cl.$^4$ .................................... B05D 1/36
[52] U.S. Cl. .................... 427/409; 148/244; 427/3288.1; 427/403; 427/407.1
[58] Field of Search ............ 427/403, 409, 407 L, 427/388 L; 148/6.15 R

[56] References Cited

U.S. PATENT DOCUMENTS

| | | | |
|---|---|---|---|
| 3,960,611 | 6/1976 | Walker et al. | 148/6.15 R |
| 3,973,056 | 8/1976 | Fessler et al. | 427/403 X |
| 4,045,393 | 8/1977 | Krevenas et al. | 427/385.5 |
| 4,069,186 | 1/1978 | Ramig | 428/522 X |
| 4,071,380 | 1/1978 | Shutt | 148/6.15 R |
| 4,501,615 | 2/1985 | Reeder et al. | 106/14.39 |
| 4,505,748 | 3/1985 | Baxter | 106/14.39 |
| 4,547,540 | 10/1985 | Yeoman | . |
| 4,605,572 | 8/1986 | Omata et al. | 427/403 |

FOREIGN PATENT DOCUMENTS

| | | |
|---|---|---|
| 0035798 | 9/1981 | European Pat. Off. . |
| 0023371 | 8/1983 | European Pat. Off. . |
| 0068648 | 8/1985 | European Pat. Off. . |
| 2067179 | 7/1981 | United Kingdom . |
| 2073730 | 10/1981 | United Kingdom . |
| 1604383 | 12/1981 | United Kingdom . |
| 2099416 | 12/1982 | United Kingdom . |
| 2112375 | 7/1983 | United Kingdom . |
| 2118977 | 11/1983 | United Kingdom . |

*Primary Examiner*—Thurman K. Page
*Attorney, Agent, or Firm*—Steele, Gould & Fried

[57] ABSTRACT

External rust-staining, for example at the exterior of buildings or on the superstructure or topside of ships, caused by rust dripping onto a surface is inhibited by painting the surface with a top-coat paint comprising a film-forming binder and a substance capable of reacting with rust to form a colorless material. The said substance can for example be a polyphosphonate salt pigment, an oxalate or a glass releasing phosphate ions.

14 Claims, No Drawings

PAINT FOR INHIBITING RUST STAINING

This is a continuation of application Ser. No. 840,372, filed Mar. 17, 1986 now abandoned.

This invention relates to paint for structures exposed to the atmosphere, for example buildings, ships and bridges, and for construction materials which are to be used at the exterior of such structures.

Paints are applied to buildings and other structures exposed to the atmosphere in order to give protection against the weather and for decorative effect. Unfortunately, the appearance of the painted building is often rapidly marred by external rust-staining. By the term "external rust-staining" used herein in connection with a surface (or a structure or material) is meant the discolouration of the surface (or the structure or material) due to contact from the outside with rust, generally from a source external to the surface (or the structure or material), as opposed to discolouration from a source of rust beneath the surface in the underlying substrate. Iron and steel pipework, guttering and girders and other construction members may have considerable surface rust whilst still structurally sound. When it rains, the rust drips on to any surfaces below and causes an ugly brown stain which is very difficult to remove. One area where this causes particular problems is on the superstructure of ships and the upper part of the topside of ships' hulls, particularly for passenger ships such as cruise liners and ferries. These may become externally rust-stained soon after repainting. The present invention seeks to provide a means for inhibiting such external rust-staining.

Paints comprising a film-forming binder and a salt of a polyvalent metal cation and an organic polyphosphonic acid containing at least two phosphonic acid groups are disclosed in U.K. Pat. No. 2121419, principally as anti-corrosive primer paints to be applied directly to steel and other metal surfaces, but that disclosure also refers to the use of the paints in prestressed concrete either to coat the stressing bars to prevent corrosion or as an exterior coating to prevent rust-staining, that is to say staining of the surface of the concrete by rust dispersing outwards from the stressing bars beneath the surface of the concrete. It does not disclose or suggest the use of such paints for inhibiting external rust-staining of surfaces which are liable to external rust-staining due to their proximity to a source of rust capable of giving rise to external rust-staining.

According to the invention external rust-staining of a surface of a structure or of a construction material used at the exterior of a structure, which surface is liable to external rust-staining due to its proximity to a source of rust, is inhibited by applying to the surface as a top-coat paint a paint comprising a film-forming binder and a substance capable of reacting with rust to form a colourless material.

The structure or construction material may for example be of brick, concrete, plaster, plastics, wood, fibre board or metal, provided that in the case of metal the surface to be coated has previously been coated. Such surfaces may collectively be referred to as nonmetallic surfaces. By a "top coat paint" is meant a paint which is intended to be exposed in use, that is it is not to be over-coated. When the paint is applied to masonry such as brick or concrete it may be the only coating applied to the masonry, whereas when it is applied to metal it is applied over a primer. Such a primer is generally one containing an anti-corrosive pigment but not a substance capable of reacting with rust to form a colourless material. The most widely used anti-corrosive pigments such as zinc phosphate and zinc chromate have some effect in reducing the rate of corrosion at the metal surface but still allow some brown rust to form, particularly at cracks in the primer, which can cause extensive staining. Such internal rust-staining is inhibited by the use of the top-coat paint in addition to external rust-staining.

The substance capable of reacting with rust to form a colourless material can for example be a salt of a polyvalent metal cation and an organic polyphosphonic acid containing at least 2 phosphonic acid groups as described in U.K. patent application 2121419, an oxalate, a salt of a polycarboxylic derivative of a polyamine such as ethylene diamine tetraacetic acid, or a glass capable of releasing phosphate ions as described in U.K. Pat. No. 1604383, European Pat. No. 35798 or U.K. patent application 2073730. It is preferably included in the paint as a pigment which is sparingly soluble in water, for example having a solubility 0.01 to 2 grams per liter.

Thus according to one aspect the invention comprises the use of a paint comprising a film-forming binder and a pigment capable of reacting with rust to form a colourless material, characterised in that the paint is applied to a surface liable to rust-staining as a top-coat paint not in direct contact with metal.

The use of the paint proposed according to the present invention with its ability to inhibit rust-staining of all types, has substantial advantages in cost and convenience over the use of traditional anti-corrosive paints in preventing rust-staining. With traditional methods all the layers of paint have been removed in the area where rust-staining has occurred; and the metal surface has been cleaned of rust and then painted with an anti-corrosive primer and a top-coat paint. The paint proposed in the present invention can be applied over existing coats of paint, thereby hiding existing rust-staining and inhibiting further rust-staining.

The pigment volume concentration of the paint is preferably at least 37 percent. Lower pigment concentrations risk the occlusion of a significant proportion of the active pigment by the binder resin. Top-coat paints for metal surfaces preferably have a pigment volume concentration of about 40 percent; this is higher than that of conventional gloss top-coat paints but allows the paint to have some sheen. Paints for concrete and other masonry preferably have a pigment volume concentration of 45 to 55 percent.

The substance capable of reacting with rust to form a colourless material is generally used as 2–80 percent by weight of the total pigment in the paint, preferably as 5–50 percent by weight of the total pigment.

One type of preferred polyphosphonate salt conforms to the general formula:

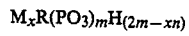

where M represents a metal ion selected from zinc, manganese, magnesium, calcium, barium, aluminium, cobalt, iron, strontium, tin, zirconium, nickel, cadmium or titanium, R represents an organic radical linked to the phosphonate groups by carbon-phosphorus bonds, m is the valency of the radical R and is at least 2, n is the valency of the metal ion M and x is from 0.8 m/n to 2 m/n.

The valency m of the organic radical R is preferably 2 to 5. The polyphosphonate may be derived from a diphosphonic acid $R(PO_3H_2)_2$, for example a hydroxyalkylidene-1,1-phosphonic acid of the formula:

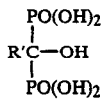

where R' is a monovalent organic radical, preferably an alkyl group having 1 to 12 carbon atoms. A preferred acid of formula (I) is etidronic acid, where $R'=CH_3$.

The polyphosphonate salt can alternatively be a salt of a polyphosphonic acid which is an amino compound containing at least two N-methylene phosphonic acid groups, for example of the formula:

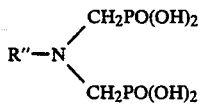

where R" is a monovalent organic radical, preferably a substituted or unsubstituted alkyl group having 1 to 12 carbon atoms such as propyl, isopropyl, butyl, hexyl, or 2-hydroxyethyl. An example of a tri-phosphonic acid $R(PO_3H_2)_3$ is amino tri(methylene-phosphonic acid) $N(CH_2PO(OH)_2)_3$. Examples of tetra-phosphonic acids $R(PO_3H_2)_4$ are alkylene diamine tetra(methylene-phosphonic acids) of the general formula:

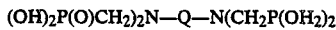

where Q is a divalent organic radical, preferably an alkylene group having 1 to 12 carbon atoms, for example ethylene diamine tetra(methylene-phosphonic acid) or hexamethylene diamine tetra(methylene-phosphonic acid). Examples of pentaphosphonic acids $R(PO_3H_2)_5$ are dialkylene triamine penta(methylene-phosphonic acids), for example diethylene triamine penta(methylene-phosphonic acid).

The ratio of metal ions to phosphonate groups in the polyphosphonate salt is preferably in the range 0.4:1 to 1:1 when the metal ion is divalent. Particularly preferred polyphosphonate salts are calcium, zinc, manganese, barium, magnesium or strontium salts containing 0.4–0.6 metal ions per phosphonate group, for example calcium etidronate having a molar ratio of calcium to etidronate groups of about 1:1.

The preferred oxalate salt for use as a pigment is zinc oxalate. More soluble oxalates such as sodium oxalate or calcium oxalate can be used, as can acidic phosphate salts such as calcium dihydrogen phosphate, but these preferably do not form more than 20 percent by weight of the total pigment and are preferably used in conjunction with a etidronate.

The paint proposed according to the invention may contain a molybdate such as sodium zinc molybdate as well as the rust-reacting pigment. The molybdate may give increased effective life to the paint. The molybdate may be precipitated on the surface of a carrier pigment, for example sodium zinc molybdate on zinc oxide. The ratio of the molybdate to the rust-reacting pigment is preferably 1:4 to 1:50 by weight.

The film-forming binder for this top-coat paint can in general be any of those used in the paint industry, for example an alkyd resin (including modified alkyds), an epoxy resin (including epoxy esters), an oleoresin, a chlorinated rubber, a vinyl resin, a polyurethane, a polyester, an organic or inorganic silicate, a polyamide, or an acrylic polymer. Two or more compatible film-forming organic polymers can be used in the paint. An extender resin such as a hydrocarbon resin can be present. A plasticiser for the binder resin, for example a chlorinated paraffin or a low molecular weight resin such as an acrylic resin or a polybutene, may be used. A preferred binder for a masonry paint is, for example, an acrylic polymer such as a copolymer of one or more alkyl acrylates and methacrylates, preferably a styrene/acrylic copolymer containing 25–70 percent of acrylic ester units and 25–70 percent of styrene units. Top-coat paints for use over a primer on metallic structures can, for example, use such an acrylic binder, preferably a styrene/acrylic copolymer, or an alkyd resin. The presence of a plasticiser is highly preferred with such styrene/acrylic copolymers.

The invention is illustrated by the following Examples:

EXAMPLE 1

A white paint having a pigment volume concentration of 50 percent and suitable for use on masonry was prepared by ball-milling the following ingredients until the particle size of the etidronate was about 40 microns.

|  | Percent By Weight |
| --- | --- |
| 'Pliolite AC-4' styrene acrylic copolymer | 7.8 |
| 'Cereclor' chlorinated paraffin plasticiser | 7.8 |
| Calcium etidronate (as prepared in Example 15 of U.K. Patent Application 2121419) | 18.3 |
| Titanium dioxide | 16.1 |
| Calcium carbonate | 8.3 |
| Mica | 2.1 |
| Diatomaceous earth | 2.2 |
| Zinc oxide | 0.9 |
| Bentonite | 0.4 |
| White spirit solvent | 27.4 |
| Xylene solvent | 8.7 |

A comparison paint was prepared in which the calcium etidronate was replaced by a further 12.1 percent calcium carbonate, 3.0 percent mica and 3.2 percent diatomaceous earth.

The two paints were painted side by side on a concrete building beneath a rusty steel, fixed exterior ladder. After 6 months' exposure to the weather, the comparison paint was stained with streaks of rust washed off the ladder by rain. The paint of Example 1 remained white and unstained even after 18 months' exposure.

EXAMPLE 2

A masonry paint was prepared having the composition described in Example 1 but containing only 16.3 percent calcium etidronate and 2.0 percent sodium zinc molybdate.

EXAMPLES 3 AND 4

Top-coat paints having a pigment volume concentration of about 40 percent and suitable for use on the upper parts of ships were prepared using the formulations of Examples 1 and 2 respectively with the omission of the calcium carbonate.

The paints of Examples 2 to 4 had the same good rust stain inhibition as the paint of Example 1.

EXAMPLE 5

A masonry paint was prepared having the composition described in Example 1 but with the calcium etidronate replaced by zinc oxalate.

I claim:

1. A process for inhibiting external rust staining of a surface of a structure exposed to the atmosphere or of a construction material used at the exterior of a structure exposed to the atmosphere, said surface being liable to external rust staining due to its proximity to a source of rust and being coated with a primer, which process comprises applying as a top coat to the surface a paint composition comprising a film-forming binder and a pigment composition comprising at least two pigments, said paint composition having a pigment volume concentration of at least 37% and said pigment composition including 2-80% by weight of a pigment capable of reacting with rust to form a colourless material.

2. A process according to claim 1, in which said surface is the surface of a metal structure which has been coated with a primer which contains an anti-corrosive pigment but does not contain a substance capable of reacting with rust to form a colourless material.

3. A process for inhibiting external rust staining of a surface of a structure exposed to the atmosphere or of a construction material used at the exterior of a structure exposed to the atmosphere, said surface being liable to external rust staining due to its proximity to a source of rust and being coated with a primer, which process comprises applying as a top coat to the surface a paint composition comprising a plasticized styrene/acrylic polymer film-forming binder and a pigment composition comprising at least two pigments, said paint composition having a pigment volume concentration of at least 37% and said pigment composition including 2-80% by weight of a pigment capable of reacting with rust to form a colourless material.

4. A process for inhibiting external rust staining of surfaces on the superstructure of a ship or on the upper part of the topside of a ship's hull due to their proximity to sources of rust, which comprises applying a paint comprising a film-forming binder and a pigment composition comprising at least two pigments, said pigment composition including 2-80% by weight of a pigment capable of reacting with rust to form a colourless material and selected from the group consisting of salts of polyvalent metal cations and organic polyphosphonic acids containing at least two phosphonic acid groups as top coat paint to said surfaces with the interposition of a primer coat which does not contain said pigment capable of reacting with rust between said top coat paint and any bare metal surface underlying the top coat paint.

5. A process according to claim 1, in which the pigment capable of reacting with rust is used at 5-50 percent by weight of the total pigment in the paint.

6. A process according to claim 1, in which the pigment capable of reacting with rust is a salt of a polyvalent metal cation and an organic polyphosphonic acid containing at least two phosphonic acid groups.

7. A process according to claim 1, in which the pigment capable of reacting with rust is calcium etidronate having a molar ratio of calcium to etidronate groups of about 1:1.

8. A process according to claim 1, in which the pigment capable of reacting with rust is a salt of a polyvalent metal cation and an organic polyphosphonic acid containing at least two phosphonic acid groups, and the paint additionally contains a molybdate.

9. A process according to claim 4, in which the pigment capable of reacting with rust is calcium etidronate having a molar ratio of calcium to etidronate groups of about 1:1.

10. A process according to claim 9, in which the paint contains a molybdate.

11. A process according to claim 1, wherein said surface comprises a surface coated with an existing coat of paint which has become rust-stained.

12. A process according to claim 6, wherein said polyphosphonate salt has the formula:

$$M_xR(PO_3)_mH_{(2m-xn)}$$

wherein M is a metal ion selected from the group consisting of zinc, manganese, magnesium, calcium, barium, aluminum, cobalt, iron, strontium, tin, zirconium, nickel, cadmium and titanium, R is an organic radical linked to the phosphonate groups by carbon-phosphorus bonds, m is the valency of the radical R and is at least 2, n is the valency of the metal ion M and x is from 0.8 m/n to 2 m/n.

13. A process according to claim 4, wherein said polyphosphonate salt has the formula:

$$M_xR(PO_3)_mH_{(2m-xn)}$$

wherein M is a metal ion selected from the group consisting of zinc, manganese, magnesium, calcium, barium, aluminum, cobalt, iron, strontium, tin, zirconium, nickel, cadmium and titanium, R is an organic radical linked to the phosphonate groups by carbon-phosphorus bonds, m is the valency of the radical R and is at least 2, n is the valency of the metal ion M and x is from 0.8 m/n to 2 m/n.

14. A process according to claim 1 in which the paint composition has a pigment volume concentration of about 40 percent and is applied to a coated metal surface.

* * * * *